(12) United States Patent
Seki et al.

(10) Patent No.: US 6,983,027 B2
(45) Date of Patent: Jan. 3, 2006

(54) OFDM TRANSMIT SIGNAL RECEIVER

(75) Inventors: Takashi Seki, Yokohama (JP); Takeshi Koyama, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 698 days.

(21) Appl. No.: 09/987,881

(22) Filed: Nov. 16, 2001

(65) Prior Publication Data

US 2002/0061076 A1  May 23, 2002

(30) Foreign Application Priority Data

Nov. 17, 2000  (JP) .............................. 2000-351611

(51) Int. Cl.
  *H03K 9/00*  (2006.01)

(52) U.S. Cl. ...................................................... 375/316

(58) Field of Classification Search ................ 375/326, 375/132, 140, 341, 285, 324, 340, 316, 329, 375/331, 335, 337, 325, 332; 370/206, 208, 370/210, 503, 344

See application file for complete search history.

(56) References Cited

U.S. PATENT DOCUMENTS 5,771,224 A * 6/1998 Seki et al. .................. 370/206
5,959,965 A * 9/1999 Ohkubo et al. ............. 370/203

(Continued)

FOREIGN PATENT DOCUMENTS

JP          2954570     9/1999
JP       2001-156738    6/2001

OTHER PUBLICATIONS

Pierrer Combelles, et al., "A Receiver Architecture Conforming to the OFDM Based Digital Video Broadcasting Standard for Terrestrial Transmission (DVB-T)", Communications, 1998, ICC 98, Conference Record, 1998 IEEE International Conference on Atlanta, GA, Jun. 7-11, 1998, vol. 2, pp. 780-785.

(Continued)

*Primary Examiner*—Emmanuel Bayard
(74) *Attorney, Agent, or Firm*—Oblon, Spivak, McClelland, Maier & Neustadt, P.C.

(57) ABSTRACT

A demodulation circuit receives an OFDM transmit signal containing an information carrier, an additive-information transmission carrier, and a reception-synchronization pilot signal to convert these carriers and signal into frequency-axial data. The information carrier transmits information data. The additive-information transmission carrier and the reception-synchronization pilot signal have a lower multi-valued modulation degree than the information carrier. A differential detection circuit conducts detection processing by using a detection-subject symbol of a plurality of symbols indicated at a predetermined interval in the same frequency range and a symbol ahead that detection-subject symbol by a predetermined time in either one output of the additive-information transmission carrier and the reception-synchronization pilot signal output from the demodulation circuit. A first S/N ratio generating circuit generates an S/N ratio based on a detection output provided from the differential detection circuit. The S/N ratio indicates the reception quality of the OFDM transmit signal.

20 Claims, 7 Drawing Sheets

U.S. PATENT DOCUMENTS

| | | | |
|---|---|---|---|
| 6,044,106 A * | 3/2000 | Suzuki | 375/219 |
| 6,055,415 A * | 4/2000 | Suzuki | 455/69 |
| 6,130,859 A * | 10/2000 | Sonnenschein et al. | 367/134 |
| 6,148,045 A * | 11/2000 | Taura et al. | 375/344 |
| 6,192,056 B1 * | 2/2001 | Tsuruoka | 370/504 |
| 6,269,128 B1 * | 7/2001 | Usui | 375/326 |
| 6,341,123 B1 * | 1/2002 | Tsujishita et al. | 370/210 |
| 6,587,510 B1 * | 7/2003 | Minami et al. | 375/285 |
| 6,680,901 B1 * | 1/2004 | Yamamoto et al. | 370/208 |
| 6,744,828 B1 * | 6/2004 | Uchiyama et al. | 375/326 |

OTHER PUBLICATIONS

Maja Sliskovic, et al., "Clock Frequency Synchronisation in OFDM System for Power Line Communications", Image and Signal Processing and Analysis 2000, Proceedings of the First Int'l Workshop on Jun. 14-15, 2000, pp. 241-246.

* cited by examiner

OFDM TRANSMIT SIGNAL RECEIVER

CROSS-REFERENCE TO RELATED APPLICATIONS

This application is based upon and claims the benefit of priority from the prior Japanese Patent Application No. 2000-351611, filed Nov. 17, 2000, the entire contents of which are incorporated herein by reference.

BACKGROUND OF THE INVENTION

1. Field of the Invention

The present invention relates to a receiver for receiving an OFDM (Orthogonal Frequency Division Multiple) transmit signal, and more particularly, it relates to improvement in the detection of a reception quality signal used particularly in antenna adjustment.

2. Description of the Related Art

Recently, a digital transmission system by use of an OFDM transmit signal has been put to practical use especially in a field of terrestrial digital broadcasting. The OFDM method acts to allocate data to a plurality of mutually orthogonal carriers (carrier waves) for modulation and demodulation, by which a transmission side conducts reverse FFT (Fast Fourier Transfer) processing and a reception side does FFT processing.

For each of the carriers transmitted by the OFDM method, an arbitrary modulation method can be employed such as a QAM (Quadrature Amplitude Modulation) method by means of coherent detection and a transmission method by means of differential detection. In coherent detection, a pilot symbol with an already known quality is periodically inserted beforehand so that the reception side may obtain a difference of a received signal with respect to the pilot symbol to thereby equalize the amplitude and the phase of the received signal. In differential detection, a received signal is differential-coded between the received symbols, to be demodulated without reproducing the carrier.

Terrestrial digital broadcasting presumes various reception conditions such as multi-path interference or interference from an existing analog broadcast, so that the magnitude of a reception power does not always indicates the reception quality. Therefore, antenna adjustment, for example, has a major object of permitting a receiver to detect a reception-quality signal at a high rate and also in a wide range.

The reception-quality signal detecting method is typically dependent on a bit error rate or an S/N ratio (variance value) of a demodulated signal.

The method by use of a bit error rate, however, has a problem that an attempt to detect a good reception state reduces errors in a received signal to thereby prolong a detection-unit time in which the number of samples required to detect a bit error rate is detected, thus spending rather a long time to detect the reception-quality signal. In the terrestrial digital broadcasting by use of the OFDM transmission system, as the modulation method is prescribed a QPSK (Quadrature Phase Shift Keying), 16QAM, or 64QAM method, so that if a reception-quality signal is detected simply using an error rate or an S/N ratio of demodulated data, the modulation method employed may restrict the detection range problematically. For example, the 64QAM method gives a small interval between the adjacent demodulated signals as compared to that by the QPSK method and so finds it difficult to detect the demodulated signals if they have a large scatter. That is, the 64QAM modulation method gives a narrow detection range of a reception-quality signal as compared to the QPSK method.

BRIEF SUMMARY OF THE INVENTION

An OFDM transmit signal receiver according to an aspect of the present invention comprises: a demodulation circuit receiving an OFDM transmit signal containing an information carrier, an additive-information transmission carrier, and a reception-synchronization pilot signal to convert the information carrier, the additive-information transmission carrier, and the reception-synchronization pilot signal into frequency-axial data, the information carrier transmitting information data, the additive-information transmission carrier having a lower multi-valued modulation degree than the information carrier, and the reception-synchronization pilot signal having a lower multi-valued modulation degree than the information carrier; a differential detection circuit conducting detection using a detection-subject symbol of a plurality of symbols indicated at a predetermined interval in the same frequency range and using a symbol ahead the detection-subject symbol by a predetermined time in at least either one output of the additive information transmission carrier and the reception-synchronization pilot signal output from the demodulation circuit; and a first S/N ratio generation circuit generating an S/N ratio based on a detection output provided from the differential detection circuit, the S/N ratio indicating a reception quality of the OFDM transmit signal.

DETAILED DESCRIPTION OF THE INVENTION

The following will describe embodiments of the present invention with reference to the drawings.

Figure 1:
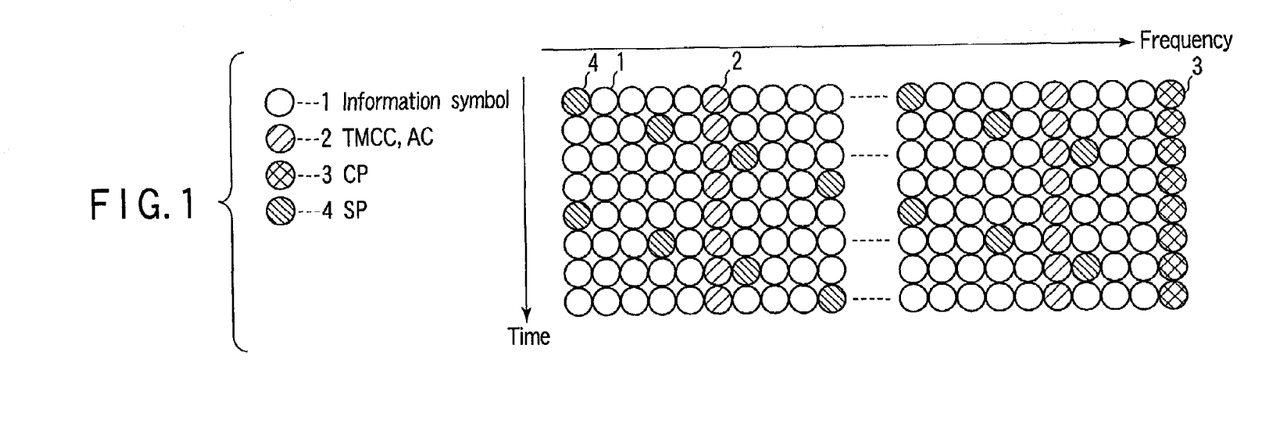
FIG. 1 is a schematic illustration for showing an example of formatting an OFDM transmit signal used in an embodiment of the present invention.

First, an example of formatting an OFDM transmit signal used in embodiments of the present invention is described. FIG. 1 is a schematic illustration for showing an example of formatting the OFDM transmit signal used in the embodiment, in which its horizontal axis indicates a frequency and a vertical axis, a time.

In FIG. 1, information symbol 1 is used to transmit information data such as images and speeches and modulated by, for example, the 64QAM method. TMCC carrier (carrier wave) and AC carrier 2 are used to transmit transmission parameter information (e.g., modulation method, interleave) and additive information respectively and transmitted by a carrier (frequency slot) at a specific frequency by the differential BPSK (Binary Phase Shift Keying) method.

Furthermore, a consecutive pilot (hereinafter abbreviated as CP) signal 3 is a non-modulated signal transmitted by a carrier (frequency slot) at a specific frequency and used for synchronization of received signals. A scattered pilot (hereinafter abbreviated as SP) signal 4 is a non-modulated signal transmitted as scattered along the frequency and time axes and used by a receiver when it guesses a transmission path properties or synchronous-reproduce a carrier.

First Embodiment

The following will describe an Orthogonal Frequency Division Multiple transmit signal receiver (hereinafter abbreviated as OFDM transmit signal receiver) according to the first embodiment of the present invention.

Figure 2:
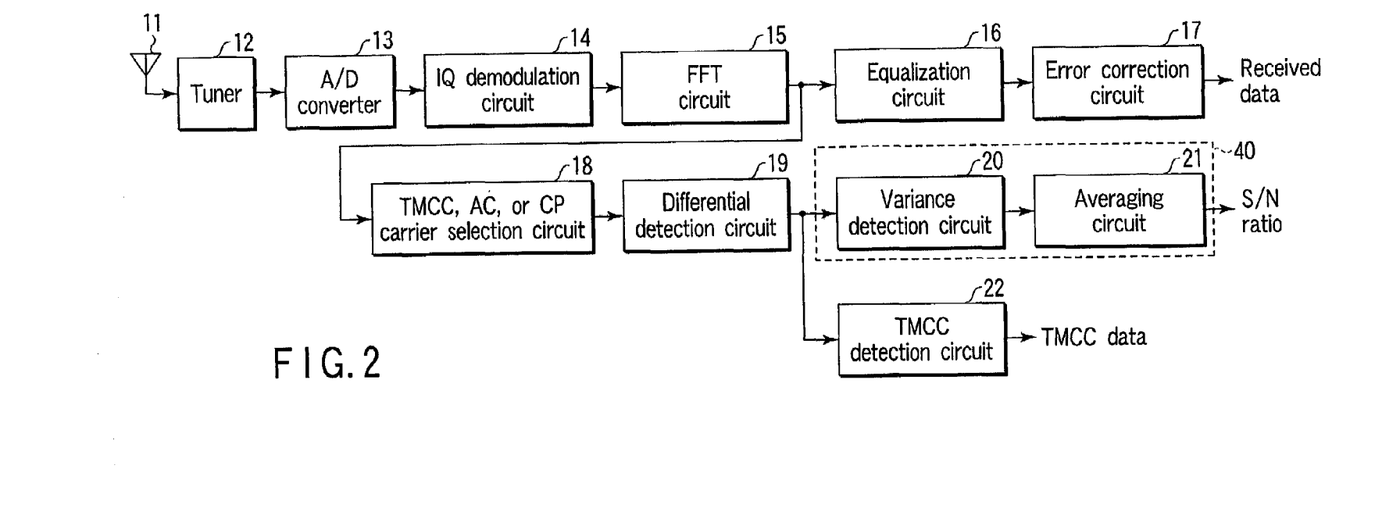
FIG. 2 is a block diagram for showing a configuration of an OFDM transmit signal receiver according to a first embodiment of the present invention.

FIG. 2 is a block diagram for showing a configuration of an OFDM transmit signal receiver according to the first embodiment.

In FIG. 2, OFDM transmit signals received at an antenna 11 are input to a tuner 12, which then selects such an OFDM transmit signal of these that is of a predetermined channel and converts it into an IF (intermediate frequency) band signal. An output of the tuner 12 is supplied to an analog/digital converter (A/D converter) 13, which then converts it into a digital signal.

An output of the A/D converter 13 is supplied to an IQ demodulation circuit 14. The IQ demodulation circuit 14 is comprised of a quadrature detection circuit, which serves to detect the output of the A/D converter 13 in a quasi-synchronous orthogonal manner and convert it into a complex base-band signal. The complex base-band signal output from the IQ demodulation circuit 14 is supplied to an FFT (Fast Fourier Transfer) circuit 15. The FFT circuit 15 conducts FFT (Fast Fourier Transfer) operations on the complex base-band signal to convert this time-axial data into frequency-axial data. By this processing, an output of the FFT circuit 15 takes on such a signal format as shown in FIG. 1.

The output of the FFT circuit 15, which indicates a phase and an amplitude of each carrier of the OFDM transmit signal, is supplied to an equalization circuit 16. This equalization circuit 16 uses the SP signal 4 shown in FIG. 1 to thereby guess a transmission-path response over all the times and all the frequencies in order to then equalize the amplitude, phase, etc. of the information symbol 1 according to a demodulation method which corresponds to this transmission-path response. An output of the equalization circuit 16 is supplied to an error correcting circuit 17, which then conducts decoding for error correction, that is, corrects errors which occurred during transmission, an output of which is provided as received data.

Furthermore, the output of the FFT circuit 15 branches to be supplied to a carrier selection circuit 18. The carrier selection circuit 18 selects either one of the TMCC carrier and AC carrier 2 and the CP carrier 3 and supplies it to a differential detection circuit 19. The differential detection circuit 19 detects thus selected carrier by considering a previous symbol of the same frequency to be a transmission-path response. That is, the differential detection circuit 19 conducts detection processing by using a detection-subject symbol of a plurality of symbols given at a predetermined interval in the same frequency range and also using a symbol preceding in time by a predetermined time. By the differential detection processing, a current symbol is divided by a preceding one, thus enabling detection without reproducing the carrier.

An output of the differential detection circuit 19 is supplied to an S/N ratio generation circuit 40 having a variance detection circuit 20 and an averaging circuit 21. The S/N ratio generation circuit 40 uses these variance detection circuit 20 and averaging circuit 21 to thereby generate an S/N ratio indicative of a reception quality of a received signal, based on a detection output provided from the differential detection circuit 19.

The following will describe the operations of the variance detection circuit 20 and the averaging circuit 21. The variance detection circuit 20 decides a detection output for each of the TMCC and AC carriers to thereby obtain a BPSK reference signal point and then gets a squared value (I variance value) of a difference between a detection output I signal and the reference I signal and another squared value (Q variance value) of a difference between a detection output Q signal and the reference Q signal. As for the CP carrier, a squared value (I variance value) of a difference between the detection output I signal and the known reference I signal and another squared value (Q variance value) of a difference between the detection output Q signal and the known reference Q signal are obtained.

An output (I and Q variance values) of the differential detection circuit 20 is supplied to the averaging circuit 21. The averaging circuit 21 averages I and Q variance values of each of the TMCC carrier and AC carrier as well as the CP carrier both in the frequency direction (between complex carriers) and the time direction (between complex symbols) and outputs an thus obtained average as an S/N ratio of a received signal. It should be noted that the averaging circuit 21 may synthesize an average based on the I variance values and that based on the Q variance values into an S/N ratio or take only an average based on the I variance values or the Q variance values as an S/N ratio.

Furthermore, the output of the delayed circuit 19 branches to be supplied to the TMCC detection circuit 22. The TMC detection circuit 22 detects and decodes a TMCC carrier of a differential detection output provided from the differential detection circuit 19 and outputs it as TMCC data. Thus output TMCC data is supplied to each sections of the receiver, which then use it for setting a carrier modulation parameter, an error correction parameter, etc.

In such a configuration, this OFDM transmit signal receiver uses such data that has a lower multi-valued modulation level than information symbol 1 (64QAM), that is, the TMCC carrier and AC carrier 2 and the CP carrier 3 (differential BPSK) to thereby detect an S/N ratio (variance value) of a received signal. This enables detecting an S/N ratio over a wide range of frequencies of the received signal. Moreover, since variance of the complex carriers (TMCC and AC carriers 2 and CP carrier 3) scattered in a transmission band are averaged, it is possible to detect an S/N ratio which corresponds to the reception quality of the received data as a whole.

Although this first embodiment has been described with an example where all of the TMCC carrier, the AC carrier, and the CP carrier are used to obtain an S/N ratio, some of these may be used to do so. Moreover, it is possible to consider the CP carrier to have been BPSK-modulated to thereby obtain a BPSK reference signal point for scatter detection.

Furthermore, either one of the Q variance and the Q variance may be used to detect an S/N ratio. It should be noted that if the TMCC carrier, the AC carrier, and the CP carrier have different transmission powers, prior to averaging processing by the averaging circuit 21, it is necessary to use the differential detection circuit 19 or the variance detection circuit 20 to normalize a signal level.

Second Embodiment

The following will describe the OFDM transmit signal receiver according to the second embodiment of the present invention.

Figure 3:
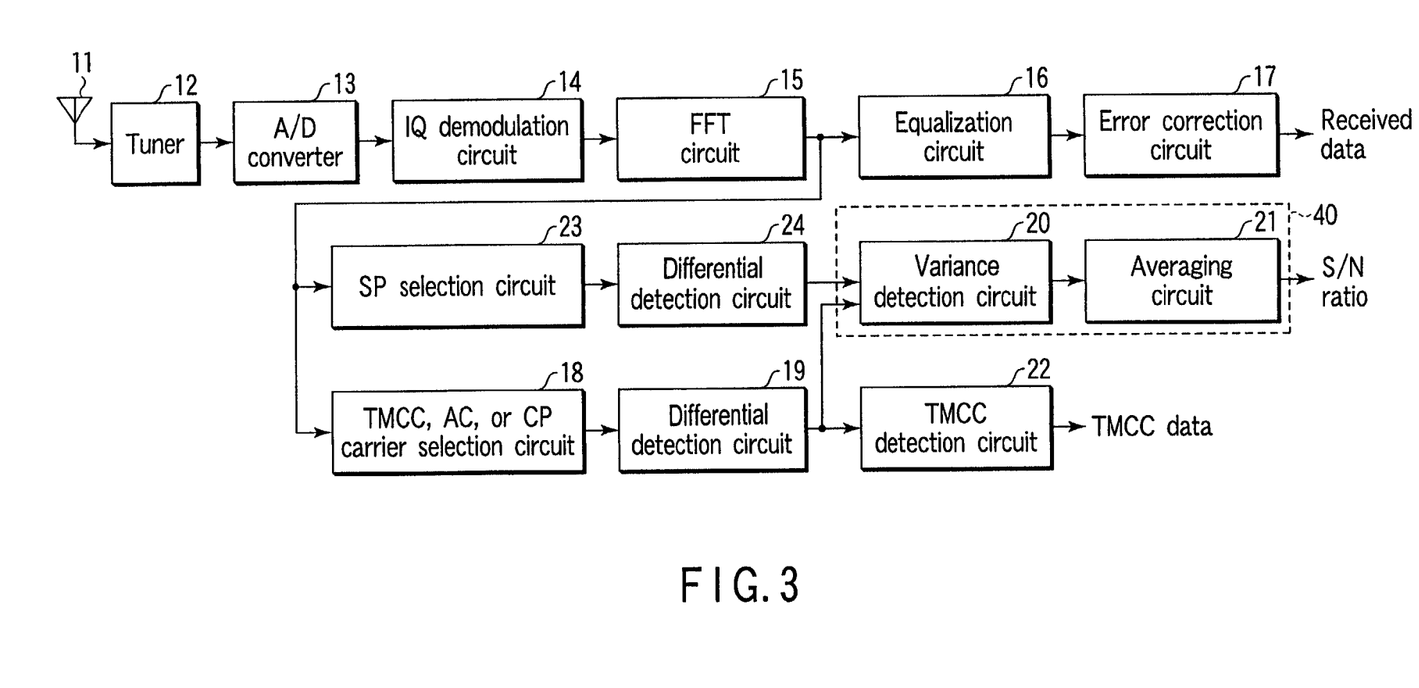
FIG. 3 is a block diagram for showing a configuration of an OFDM transmit signal receiver according to a second embodiment of the present invention.

FIG. 3 is a block diagram for showing a configuration of the OFDM transmit signal receiver according to the second embodiment. In addition to the configuration of the first embodiment shown in FIG. 2, the OFDM transmit signal receiver of this second embodiment has an SP selection circuit 23 for detecting an S/N ratio of a received signal using the SP signal 4 and a differential detection circuit 24. The same components as those of the first embodiment are indicated by the same reference numerals and so their explanation is omitted to describe only the different components as follows.

As shown in FIG. 3, an output of the above-mentioned FFT circuit 15 branches to be supplied to the SP selection circuit 23. The SP selection circuit 23 selects only the SP signal shown in FIG. 1 and supplies it to the differential detection circuit 24. The differential detection circuit 24 detects the selected SP signal by considering a previous SP signal (data preceding four symbols in time in the same carrier in FIG. 1) to be a transmission response. That is, the differential detection circuit 24 conducts detection by using a detection-subject symbol of a plurality of symbols indicated at a predetermined interval in the same frequency region and also a symbol preceding a predetermined time. By differential detection, a current symbol is divided by a preceding one, so detection is possible without reproducing the carrier wave.

An output of the differential detection circuit 24 is supplied to the S/N ratio generation circuit 40 having the variance detection circuit 20 and the averaging circuit 21. The S/N ratio generation circuit 40 uses the variance detection circuit 20 and the averaging circuit 21 to thereby generate an S/N ratio indicative of the reception quality of a received signal, based on detection outputs provided by the differential detection circuits 19 and 24.

As for the SP signal, the variance detection circuit 20 obtains a squared value (I variance value) of a difference between a detection output I signal and a known reference I signal and a squared value (Q variance value) of a difference between a detection output Q signal and a known reference Q signal.

The I variance values and the Q variance values of the SP signal, the TMCC and AC carriers, and the CP carrier output from the variance detection circuit 20 are all supplied to the averaging circuit 21. The averaging circuit 21 averages both in the frequency direction (between a plurality of carriers) and in the time direction (between a plurality of symbols) the I and Q variance values of each of the SP signal, the TMCC and AC carriers, and the CP carrier supplied in series and outputs them as an S/N ratio (variance value) of the received signal. Note here that the averaging circuit 21 may synthesize an average based on the I variance values and that based on the Q variance values into the S/N ratio or may take only an average value based on the I variance values or the Q variance values as the S/N ratio.

In such a configuration, this OFDM transmit signal receiver can detect an S/N ratio by using also the SP signal transferred for each three carriers in addition to the TMCC and AC carriers and the CP carrier used in the detection of the S/N ratio used in the first embodiment, to thereby detect such an S/N ratio that corresponds to the reception quality of the received data as a whole.

Although the second embodiment has been described with reference to an example where the SP signal 4, which is a scatter pilot signal such as shown in FIG. 1, is used to detect an S/N ratio, the present invention is not limited by the arrangement of the pilot signal; for example, it is clear that the present invention is applicable also to a case of transmitting the pilot signals of all the carriers at a specific time.

Furthermore, the second embodiment has been described with reference to an example where an S/N ratio is detected by combining the first embodiment and the SP selection circuit 23 and the differential detection circuit 24 for detecting the S/N ratio of a received signal using the SP signal, that is by utilizing the SP signal, the TMCC and AC carriers, and the CP carrier, only the SP signal, which is a scatter pilot signal, may be used to detect the S/N ratio.

Third Embodiment

The following will describe the OFDM transmit signal receiver according to the third embodiment of the present invention.

Figure 4:
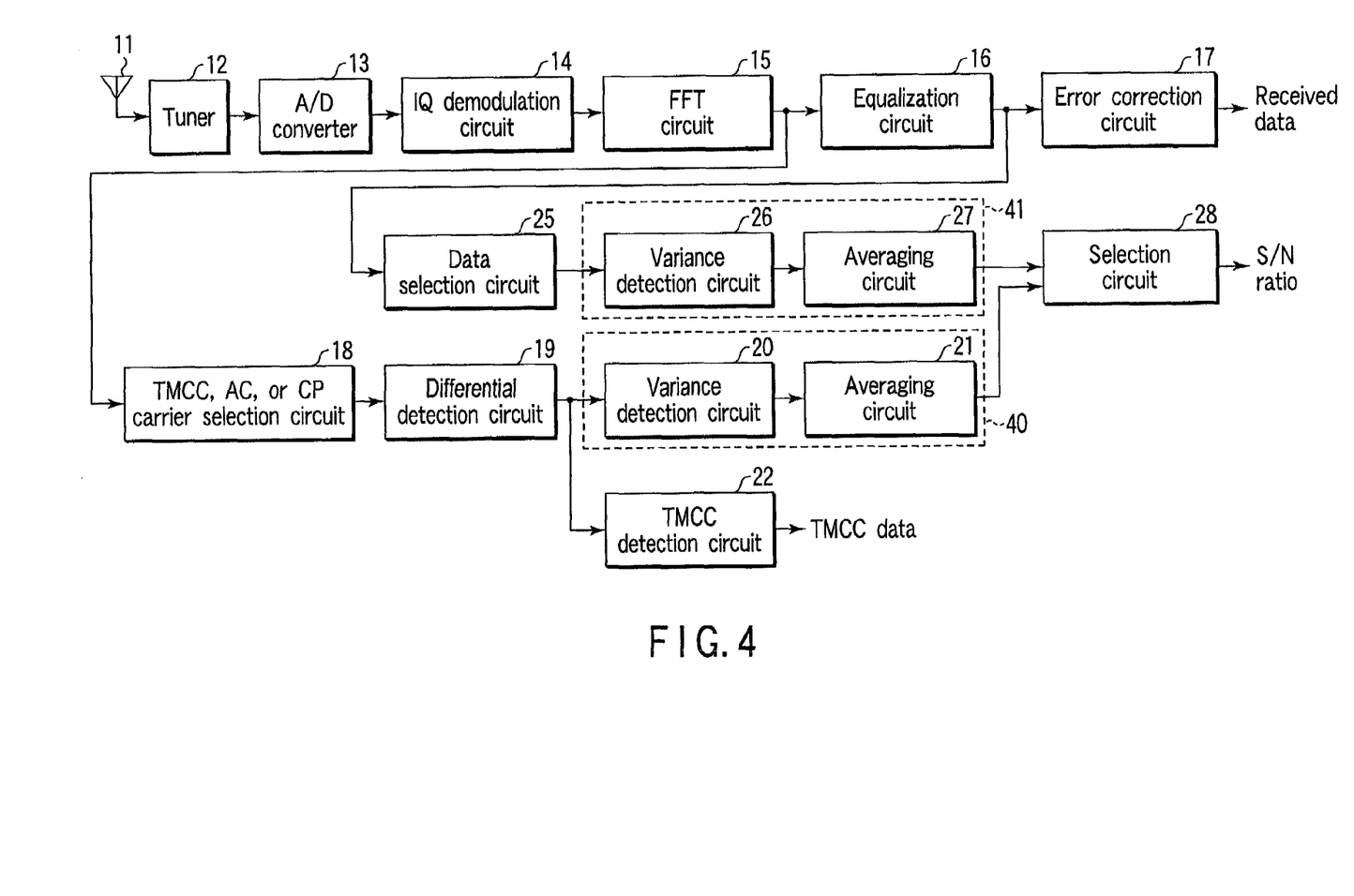
FIG. 4 is a block diagram for showing a configuration of an OFDM transmit signal receiver according to a third embodiment of the present invention.

FIG. 4 is a block diagram for showing a configuration of the OFDM transmit signal receiver of the third embodiment. In addition to the configuration of the first embodiment shown in FIG. 2, the OFDM transmit signal receiver of the third embodiment has a data selection circuit 25 for using information symbol 1 to detect an S/N ratio of a received signal, a variance detection circuit 26, an averaging circuit 27, and a selection circuit 28 for selecting either one of an S/N ratio detected using information symbol 1 and that detected using the TMCC and AC carriers 2 and the CP carrier 3. The same components as those of the first embodiment are indicated by the same reference numerals and so their explanation is omitted to describe only the different components as follows.

As shown in FIG. 4, an output of the above-mentioned equalization circuit 16 branches to be supplied to the data selection circuit 25. The data selection circuit 25 selects only information symbol 1 shown in FIG. 1 and supplies it to an S/N ratio generation circuit 41 having the variance detection circuit 26 and the averaging circuit 27. The S/N ratio generation circuit 41 uses the variance detection circuit 26 and the averaging circuit 27 to generate an S/N ratio indicative of the reception quality of a received signal, based on a signal output by the data selection circuit 25.

The operations of the variance detection circuit 26 and the averaging circuit 27 are described as follows. The variance detection circuit 26 determines a reference signal point based on a method of modulating an information symbol supplied on the basis of TMCC data, to obtain a squared value (I variance value) of a difference between an equalized output I signal and a reference I signal and a squared value (Q variance value) of a difference between q equalized output Q signal and a reference Q signal.

An output (I and Q variance values) of the variance detection circuit 26 is supplied to the averaging circuit 27. The averaging circuit 27 averages in both the frequency direction (between a plurality of carriers) and the time direction (between a plurality of symbols) the I and Q variance values of information symbols to thereby calculate an S/N ratio of these information symbols. Note here that the averaging circuit 27 may synthesize an average based on the I variance value and that based on the Q variance value into an S/N ratio or take only an average based on the I or Q variance value as an S/N ratio.

The S/N ratio of the information symbols calculated by the averaging circuit 27 and the TMCC and AC carriers and the CP carrier calculated by the averaging circuit 21 are all supplied to the selection circuit 28.

The selection circuit 28 uses the information symbol modulation method and the S/N ratios of the TMCC and AC carriers, and the CP carrier to thereby decide whether an S/N ratio of the information symbol is valid or invalid. If, for example, the S/N ratio values (variance values) of the TMCC and AC carriers and the CP carrier are larger than a predetermined value which depends on the modulation method, the S/N ratio based on the information symbol is decided to be invalid, so that the S/N ratios of the TMCC and AC carriers and the CP carrier are output as an S/N ratio of the received signal. If the S/N ratio values of the TMCC and AC carriers and the CP carrier are smaller than the predetermined value which depends on the modulation method, the S/N ratio based on the information symbol is decided to be valid, so that the S/N ratio of the information symbol is output as an S/N ratio of the received signal.

Furthermore, it is possible to use a synthesis circuit in place of the selection circuit 28 to thereby weight with the number of carriers an S/N ratio of an information symbol and S/N ratios of the TMCC and AC carriers and the CP carrier and synthesize and them.

In such a configuration, this OFDM transmit signal receiver uses also an information symbol to detect an S/N ratio if the S/N ratio values of the TMCC and AC carriers and the CP carrier are smaller than a predetermined value which depends on an information symbol modulation method and, if they are larger than that predetermined value, that is the reception conditions are decided not to be good, does not use the information symbol to detect the S/N ratio. This enables detecting an S/N ratio over a wide range of frequencies of the received signal. Further, if the reception conditions are decided to be good, a more correct S/N ratio can be detected.

Although the third embodiment has been described with reference to an example where the first embodiment is combined with the data selection circuit 25, the variance detection circuit 26, the averaging circuit 27, and the selection circuit 28, it is also possible to obtain an S/N ratio of the received signal by combining the second embodiment with the data selection circuit 25, the variance detection circuit 26, the averaging circuit 27, and the selection circuit 28, that is, by using an S/N ratio detected using the SP signal being a scatter pilot signal, the TMCC and AC carriers, and the CP carrier and an S/N ratio detected using an information symbol.

Fourth Embodiment

The following will describe the OFDM transmit signal receiver according to the fourth embodiment of the present invention.

Figure 5:
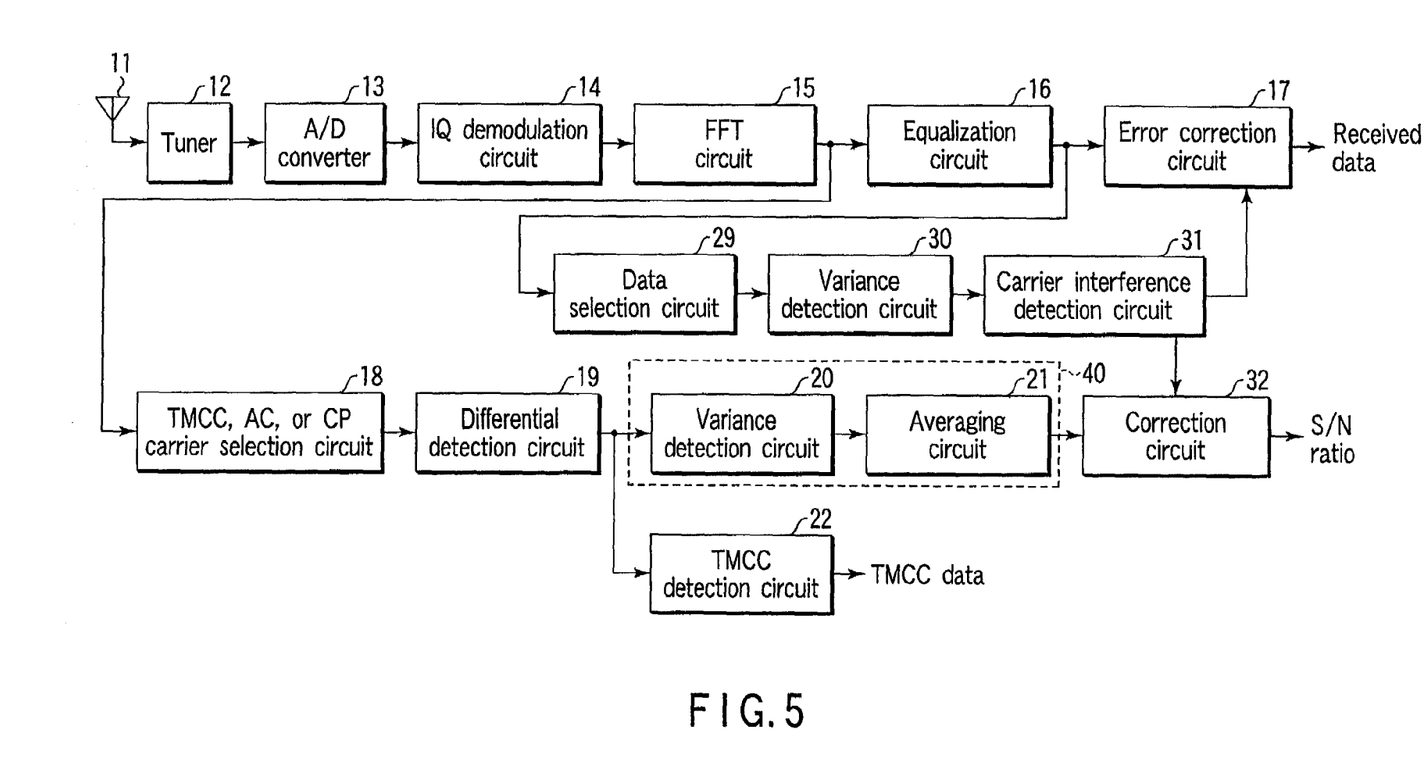
FIG. 5 is a block diagram for showing a configuration of an OFDM transmit signal receiver according to a fourth embodiment of the present invention.

FIG. 5 is a block diagram for showing a configuration of the OFDM transmit signal receiver of the fourth embodiment. In addition to the configuration of the first embodiment shown in FIG. 2, the OFDM transmit signal receiver of the fourth embodiment has a data selection circuit 29 for using a carrier interference detection result to detect an S/N ratio of a received signal, a variance detection circuit 30, a carrier interference detection circuit 31, and a correction circuit 32. The same components as those of the first embodiment are indicated by the same reference numerals and so their explanation is omitted to describe only the different components as follows.

As shown in FIG. 5, an output of the above-mentioned equalization circuit 16 branches to be supplied to the data selection circuit 29. The data selection circuit 29 selects only information symbol 1 shown in FIG. 1 and supplies it to the variance detection circuit 30. The variance detection circuit 30 determines a reference signal point based on an information symbol 1 modulation method supplied on the basis of TMCC data to obtain a squared value (I variance value) of a difference between an equalization output I signal and a reference I signal and a squared value (Q variance value) of a difference between an equalization output Q signal and a reference Q signal.

An output (I and Q variance values) of the variance detection circuit 30 is supplied to the carrier interference detection circuit 31. The carrier interference detection circuit 31 averages variance values, in the time direction, for those carriers (frequency slots) that are at respective specific frequencies to thereby decide such a carrier as being interfered that came up with an average larger than a predetermined value.

A decision result of carrier interference made by the carrier interference detection circuit 31 is supplied to the error correction circuit 17. Based on the decision result of carrier interference, this error correction circuit 17 conducts error correction processing by, for example, eliminating an information symbol of a carrier decided to be interfered.

Further, the carrier interference detection circuit 31 supplies the correction circuit 32 with a control signal for correcting an S/N ratio in accordance with the number of carriers interfered. In accordance with the control signal supplied from the carrier interference detection circuit 31, the correction circuit 32 conducts correction processing in such a manner as to reflect a carrier deterioration on an S/N ratio output by the averaging circuit 21 and then outputs a corrected value as an S/N ratio of the received signal.

The bit error rate, which is originally largely deteriorated if a specific carrier of the received signal is interfered, is not so large here because the S/N ratio is given by averaging the scatters of a plurality of carriers. Moreover, if some of the carriers are used to detect the S/N ratio like in the case of the first embodiment, it is impossible to reflect on the S/N ratio such a deterioration that occurs when only the information symbol is interfered.

By the fourth embodiment shown in FIG. 5, it is possible to reflect on the S/N ratio a deterioration that occurs when a specific carrier of the received signal is interfered, thus detecting more correctly such an S/N ratio that corresponds to the reception quality of received data as a whole.

Figure 6:
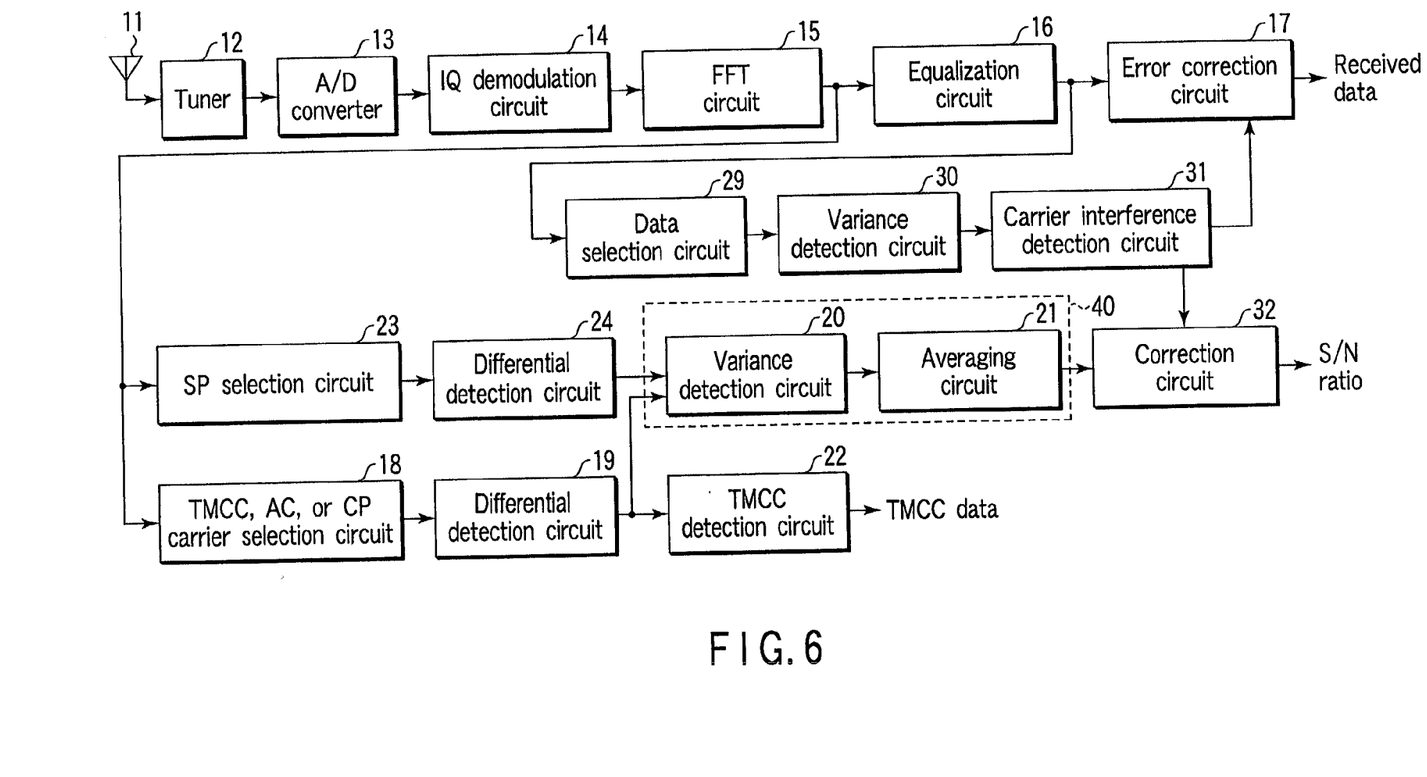
FIG. 6 is a block diagram for showing another configuration of the OFDM transmit signal receiver according to the fourth embodiment of the present invention.

Furthermore, although the fourth embodiment has been described with reference to an example where the first embodiment is combined with the data selection circuit 29, the variance detection circuit 30, the carrier interference detection circuit 31, and the correction circuit 32, that is S/N ratio values detected from the TMCC and AC carriers and the CP carrier are corrected on the basis of a result of detecting an interference of carriers using an information symbol, it is possible to, as shown in FIG. 6, combine the second embodiment with the data selection circuit 29, the variance detection circuit 30, the carrier interference detection circuit 31, and the correction circuit 32 or also to combine the third embodiment with the circuits 29, 30, 31, and 32.

The OFDM transmit signal receiver is shown in FIG. 6 in an example where S/N ratios detected from the TMCC and AC carriers and the CP carrier are corrected on the basis of a result of detecting an interference of the carriers using an information symbol. Although in this example, first the averaging circuit 21 conducts averaging processing and then correction circuit 32 conducts correction processing, these processes may be reversed in order, that is, first the correction circuit 32 conducts correction for the subsequent averaging by the averaging circuit 21.

Figure 7:
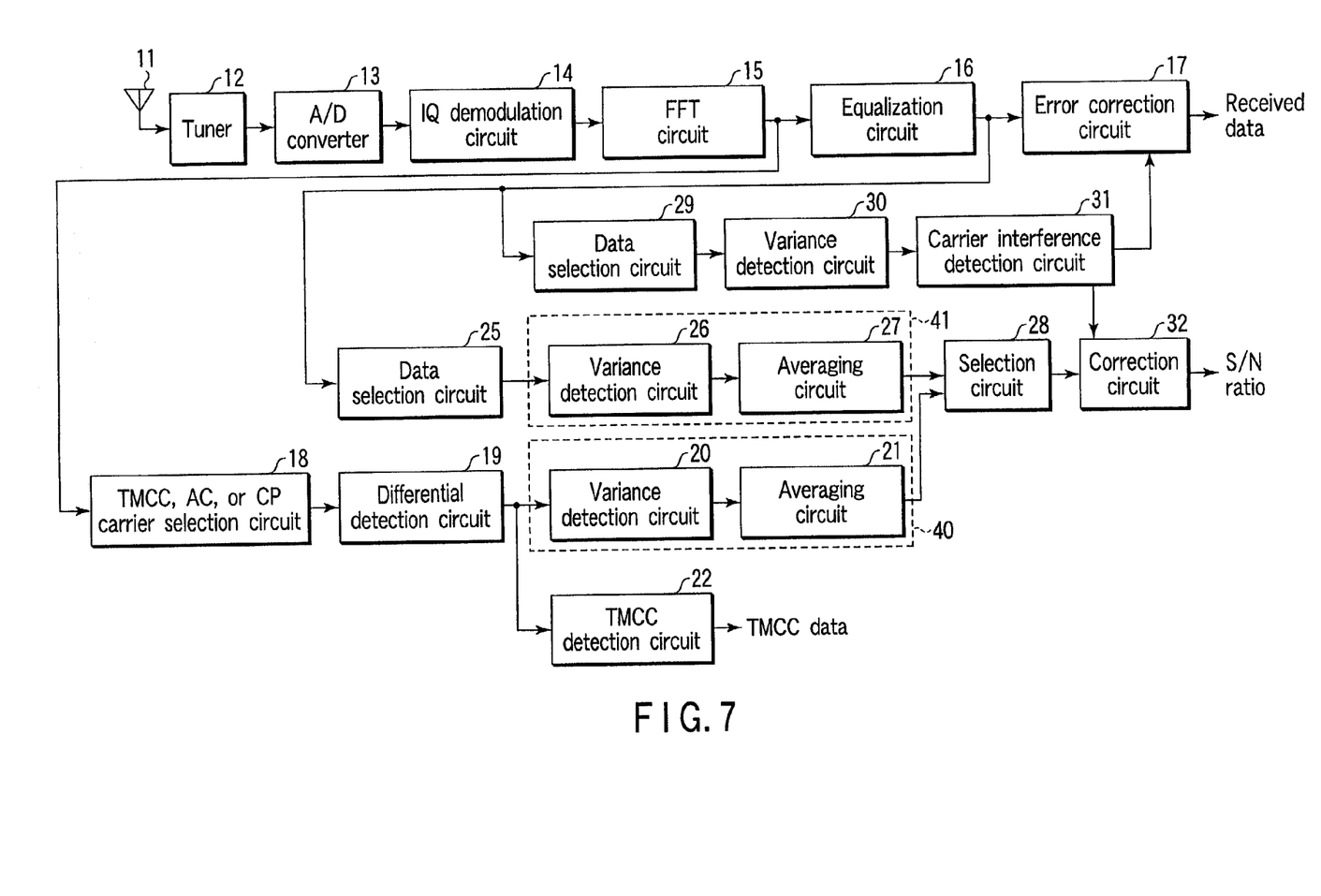
FIG. 7 is a block diagram for showing a further configuration of the OFDM transmit signal receiver according to the fourth embodiment of the present invention.

The OFDM transmit signal receiver is shown in FIG. 7 in an example where S/N ratios detected from the TMCC and AC carriers and the CP carrier are corrected on the basis of a result of detecting an interference of the carriers using an information symbol. Although in this example, first the selection circuit 28 conducts selection processing and then the correction circuit 32 conducts correction processing, these two processes may be reversed in order, that is, first the correction circuit 32 may conduct correction for the subsequent selection by the selection circuit 28.

Fifth Embodiment

The following will describe the OFDM transmit signal receiver according to the fifth embodiment of the present invention.

Figure 8:
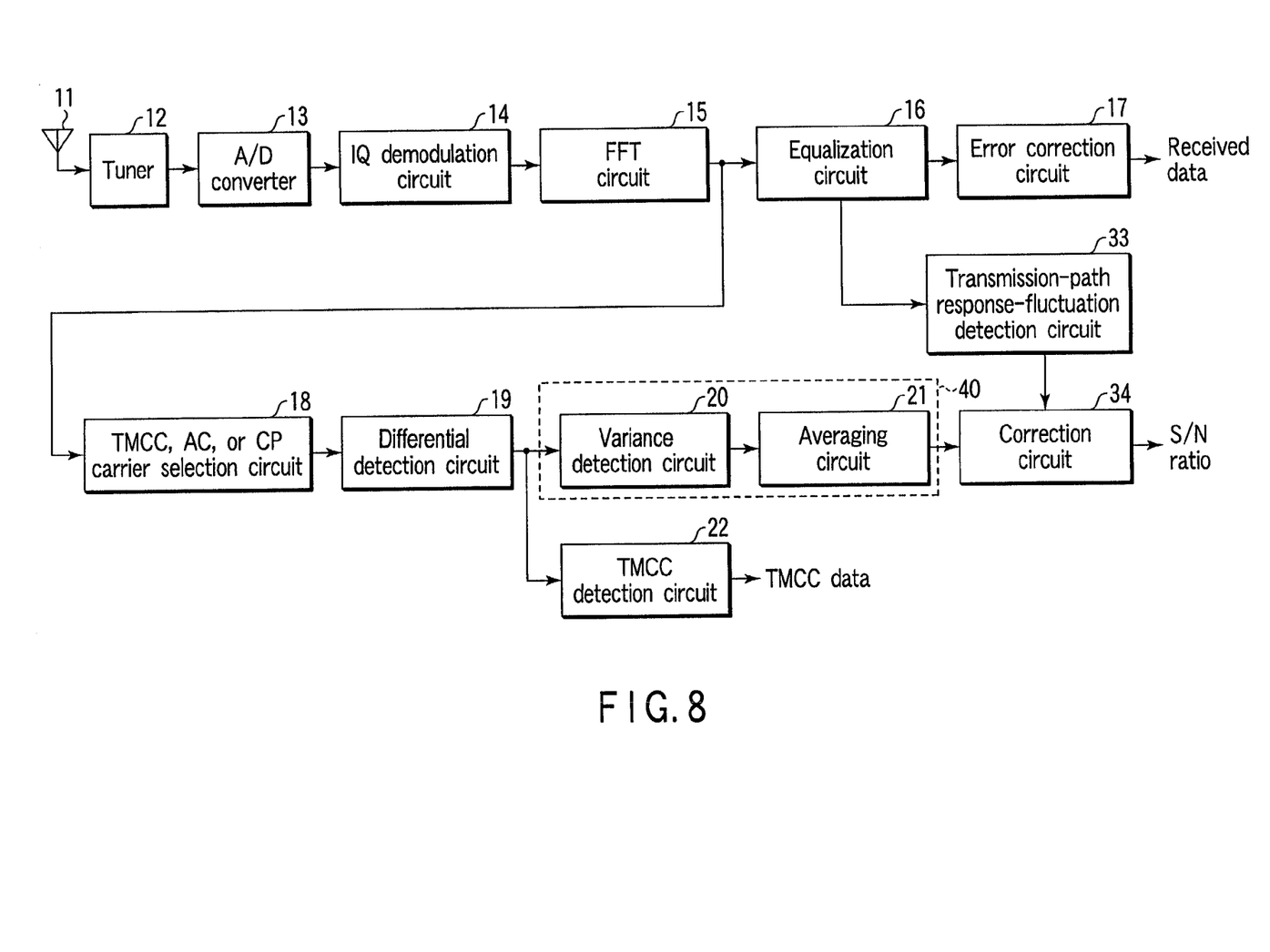
FIG. 8 is a block diagram for showing a configuration of an OFDM transmit signal receiver according to a fifth embodiment of the present invention.

FIG. 8 is a block diagram for showing a configuration of the OFDM transmit signal receiver of the fifth embodiment. In addition to the configuration of the first embodiment shown in FIG. 2, the OFDM transmit signal receiver of the fifth embodiment has a transmission-path response-fluctuation detection circuit 33 for detecting an S/N ratio of a received signal based on a result of detecting a fluctuation in transmission-path response and a correction circuit 34. The same components as those of the first embodiment are indicated by the same reference numerals and so their explanation is omitted to describe only the different components as follows.

Based on a signal output from the FFT circuit 15, the above-mentioned equalization circuit 16 demodulates and equalizes an information carrier and also guesses a transmission-path response along the time and frequency axes. As shown in FIG. 8, a transmission response guessed at the equalization circuit 16 is supplied to the transmission-path response-fluctuation detection circuit 33. The transmission-path response-fluctuation detection circuit 33 detects fluctuations in transmission-path response both in the frequency direction and the time direction to then output an S/N ratio in accordance with a frequency and a magnitude of the fluctuations.

An output of the transmission-path response-fluctuation detection circuit 33 is supplied to the correction circuit 34. In accordance with an S/N ratio correction signal sent from the transmission-path response-fluctuation detection circuit 33, the correction circuit 34 conducts correction in such a manner as to reflect a deterioration occurring due to the fluctuations transmission-path response on an S/N ratio output from the averaging circuit 21, to then output a corrected value as an S/N ratio of the received signal.

It is here to be noted that a multi-path interference, if any, causes a frequency-directional fluctuation in transmission-path response to thereby drop a reception power of a specific carrier, thus largely deteriorating the bit error rate. Moreover, in the case of mobile reception, the transmission response fluctuates also in the time direction, thus largely deteriorating the bit error rate.

To guard against this, the fifth embodiment shown in FIG. 8 detects both frequency-directional and time-directional fluctuations in transmission-path response and then corrects the S/N ratio in accordance with a level of these fluctuations to thereby reflect on the S/N ratio a deterioration in bit error rate owing to the transmission-path response, thus enabling correctly detecting such an S/N ratio that corresponds to the reception quality of received data as a whole.

Furthermore, although the fifth embodiment has been described with an example where the first embodiment shown in FIG. 2 is combined with the transmission-path response-fluctuation detection circuit 33 and the correction circuit 34, that is, S/N ratios detected from the TMCC and AC carriers and the CP carrier are corrected on the basis of a result of detecting fluctuations in transmission-path response, it is possible to combine the second embodiment shown in FIG. 3 with the transmission-path response-fluctuation detection circuit 33 and the correction circuit 34 or to combine the third embodiment shown in FIG. 4 with the transmission-path response-fluctuation detection circuit 33 and the correction circuit 34 or even to the fourth embodiment shown in FIG. 5 with the transmission-path response-fluctuation detection circuit 33 and the correction circuit 34.

Furthermore, although the OFDM transmit signal receiver the embodiments of the present invention has been described as assumed to receive an OFDM transmit signal in a signal format shown in FIG. 1, the signal format applicable to the present invention is not limited to that shown in FIG. 1.

Thus, the embodiments of the present invention enable providing an OFDM transmit signal receiver that can use an S/N ratio of a demodulated signal to thereby detect a reception-quality signal correctly at a high rate and over a wide range.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. An OFDM transmit signal receiver comprising:
   a demodulation circuit configured to receive an OFDM transmit signal containing an information carrier, an additive-information transmission carrier, and a reception-synchronization pilot signal to convert said information carrier, said additive-information transmission carrier, and said reception-synchronization pilot signal into frequency-axial data, said information carrier transmitting information data, said additive-information transmission carrier having a lower multi-valued modulation degree than said information carrier, and said reception-synchronization pilot signal having a lower multi-valued modulation degree than said information carrier;
   a differential detection circuit configured to conduct detection using a detection-subject symbol of a plurality of symbols indicated at a predetermined interval in the same frequency range and using a symbol ahead said detection-subject symbol by a predetermined time in at least either one output of said additive information transmission carrier and said reception-synchronization pilot signal output from said demodulation circuit; and
   a first S/N ratio generation circuit configured to generate an S/N ratio based on a detection output provided from said differential detection circuit, said S/N ratio indicating a reception quality of said OFDM transmit signal.

2. The OFDM transmit signal receiver according to claim 1, wherein said demodulation circuit comprises a quadrature detection circuit configured to detect said OFDM transmit signal in an orthogonal manner and a fast fourier transfer circuit conducting fast fourier transform operations to convert time-axial data of a signal output from said quadrature detection circuit into frequency-axial data.

3. The OFDM transmit signal receiver according to claim 1, further comprising:
   an equalization circuit configured to demodulate and to equalize said information carrier output from said demodulation circuit;
   a second S/N ratio generation circuit configured to generate an S/N ratio based on an equalization output provided from said equalization circuit, said S/N ratio indicating a reception quality of said OFDM transmit signal; and
   a selection circuit configured to select either one of said S/N ratio output from said first S/N ratio generation circuit and said S/N ratio output from said second S/N ratio generation circuit based on said S/N ratio output from said second S/N ratio generation circuit.

4. The OFDM transmit signal receiver according to claim 1, further comprising:
   an equalization circuit configured to demodulate and to equalize said information carrier output from said demodulation circuit;
   a second S/N ratio generation circuit configured to generate an S/N ratio based on an equalization output provided from said equalization circuit, said S/N ratio indicating a reception quality of said OFDM transmit signal; and
   a synthesis circuit configured to synthesize said S/N ratio output from said first S/N ratio generation circuit and said S/N ratio output from said second S/N ratio generation circuit in accordance with said S/N ratio output from said second S/N ratio generation circuit.

5. The OFDM transmit signal receiver according to claim 1, further comprising:
   an equalization circuit configured to demodulate and to equalize said information carrier output from said demodulation circuit;
   a carrier interference detection circuit configured to detect carrier interference/non-interference in said information carrier based on an equalization output provided from said equalization circuit; and
   a correction circuit configured to conduct correction to reflect a carrier deterioration due to said carrier interference on said S/N ratio output from said first S/N ratio generation circuit in accordance with an output provided from said carrier interference detection circuit.

6. The OFDM transmit signal receiver according to claim 2, further comprising:
   an equalization circuit configured to demodulate and to equalize said information carrier and guessing time-axial and frequency-axial transmission-path responses based on a signal output from said demodulation circuit;
   a transmission-path response-fluctuation detection circuit configured to detect frequency-directional and time-directional fluctuations of said transmission-path response by using said transmission-path response guessed at said equalization circuit; and
   a correction circuit configured to conduct correction processing, in accordance with such a fluctuation in transmission-path response that is detected by said transmission-path response-fluctuation detection circuit, to reflect a deterioration due to said fluctuation on said S/N ratio output from said first S/N ratio generation circuit.

7. The OFDM transmit signal receiver according to claim 1, wherein said first S/N ratio generation circuit comprises a detection circuit configured to obtain a squared value (I variance value) of a difference between said detection output I signal and a reference I signal and a squared value (Q variance value) of a difference between said detection output Q signal and a reference Q signal, and an averaging circuit configured to obtain an average by averaging said I and Q variance values in both a frequency direction and a time direction.

8. The OFDM transmit signal receiver according to claim 3, wherein:
   said first S/N ratio generation circuit comprises a detection circuit configured to obtain a squared value (I variance value) of a difference between said detection output I signal and a reference I signal and a squared value (Q variance value) of a difference between said detection output Q signal and a reference Q signal, and an averaging circuit configured to obtain an average by averaging said I and Q variance values in both a frequency direction and a time direction; and
   said second S/N ratio generation circuit comprises a detection circuit configured to obtain a squared value (I variance value) of a difference between said equalization output I signal and a reference I signal and a squared value (Q variance value) of a difference between said equalization output Q signal and a reference Q signal, and an averaging circuit configured to obtain an average by averaging said I and Q variance values in both a frequency direction and a time direction.

9. The OFDM transmit signal receiver according to claim 4, wherein:
   said first S/N ratio generation circuit comprises a detection circuit configured to obtain a squared value (I variance value) of a difference between said detection output I signal and a reference I signal and a squared value (Q variance value) of a difference between said detection output Q signal and a reference Q signal, and an averaging circuit configured to obtain an average by averaging said I and Q variance values in both a frequency direction and a time direction; and
   said second S/N ratio generation circuit comprises a detection circuit configured to obtain a squared value (I variance value) of a difference between said equalization output I signal and a reference I signal and a squared value (Q variance value) of a difference between said equalization output Q signal and a reference Q signal, and an averaging circuit configured to obtain an average by averaging said I and Q variance values in both a frequency direction and a time direction.

10. The OFDM transmit signal receiver according to claim 3, wherein said selection circuit decides whether said S/N ratio output from said second S/N ratio generation circuit is valid or invalid and, if said S/N ratio is decided to be valid, selects said S/N ratio output from said second S/N ratio generation circuit and, if said S/N ratio is decided to be invalid, selects said S/N ratio output from said first S/N ratio generation circuit.

11. An OFDM transmit signal receiver comprising:
   a demodulation circuit configured to receive an OFDM transmit signal containing an information carrier and a pilot signal to convert said information carrier and said pilot signal into frequency-axial data, said information carrier transmitting information data, and said pilot signal being used to guess a transmission-path response;

a differential detection circuit configured to conduct detection processing by using a detection-subject symbol of a plurality of symbols indicated at a predetermined interval in the same frequency range and using a symbol ahead said detection-subject symbol by a predetermined time in said pilot signal output from said demodulation circuit; and a first S/N ratio generation circuit configured to generate an S/N ratio based on a detection output provided from said differential detection circuit, said S/N ratio indicating a reception quality of said OFDM transmit signal.

12. The OFDM transmit signal receiver according to claim 11, wherein said demodulation circuit comprises a quadrature detection circuit configured to detect said OFDM transmit signal in an orthogonal manner and a fast fourier transfer circuit configured to conduct fast fourier transform operations to convert time-axial data of a signal output from said quadrature detection circuit into frequency-axial data.

13. The OFDM transmit signal receiver according to claim 11, further comprising:

an equalization circuit configured to demodulate and to equalize said information carrier output from said demodulation circuit;

a second S/N ratio generation circuit configured to generate an S/N ratio based on an equalization output provided from said equalization circuit, said S/N ratio indicating a reception quality of said OFDM transmit signal; and a selection circuit configured to select either one of said S/N ratio output from said first S/N ratio generation circuit and said S/N ratio output from said second S/N ratio generation circuit in accordance with said S/N ratio output from said second S/N ratio generation circuit.

14. The OFDM transmit signal receiver according to claim 11, further comprising:

an equalization circuit configured to demodulate and to equalize said information carrier output from said demodulation circuit;

a second S/N ratio generation circuit configured to generate an S/N ratio based on an equalization output provided from said equalization circuit, said S/N ratio indicating a reception quality of said OFDM transmit signal; and a synthesis circuit configured to synthesize said S/N ratio output from said first S/N ratio generation circuit and said S/N ratio output from said second S/N ratio generation circuit in accordance with said S/N ratio output from said second S/N ratio generation circuit.

15. The OFDM transmit signal receiver according to claim 11, further comprising:

an equalization circuit configured to demodulate and to equalize said information carrier output from said demodulation circuit;

a carrier interference detection circuit configured to detect carrier interference/non-interference in said information carrier based on an equalization output provided from said equalization circuit; and a correction circuit configured to conduct correction to reflect a carrier deterioration due to said carrier interference on said S/N ratio output from said first S/N ratio generation circuit in accordance with an output provided from said carrier interference detection circuit.

16. The OFDM transmit signal receiver according to claim 12, further comprising:

an equalization circuit configured to demodulate and to equalize said information carrier and guessing time-axial and frequency-axial transmission-path responses based on a signal output from said demodulation circuit;

a transmission-path response-fluctuation detection circuit configured to detect frequency-directional and time-directional fluctuations of said transmission-path response by using said transmission response guessed by said equalization circuit; and a correction circuit configured to conduct correction processing, in accordance with such a fluctuation in transmission-path response that is detected by said transmission-path response-fluctuation detection circuit, to reflect a deterioration due to said fluctuation on said S/N ratio output from said first S/N ratio generation circuit.

17. The OFDM transmit signal receiver according to claim 11, wherein said first S/N ratio generation circuit comprises a detection circuit configured to obtain a squared value (I variance value) of a difference between said detection output I signal and a reference I signal and a squared value (Q variance value) of a difference between said detection output Q signal and a reference Q signal, and an averaging circuit configured to obtain an average by averaging said I and Q variance values in both a frequency direction and a time direction.

18. The OFDM transmit signal receiver according to claim 13, wherein:

said first S/N ratio generation circuit comprises a detection circuit configured to obtain a squared value (I variance value) of a difference between said detection output I signal and a reference I signal and a squared value (Q variance value) of a difference between said detection output Q signal and a reference Q signal, and an averaging circuit configured to obtain an average by averaging said I and Q variance values in both a frequency direction and a time direction; and said second S/N ratio generation circuit comprises a detection circuit configured to obtain a squared value (I variance value) of a difference between said equalization output I signal and a reference I signal and a squared value (Q variance value) of a difference between said equalization output Q signal and a reference Q signal, and an averaging circuit configured to obtain an average by averaging said I and Q variance values in both a frequency direction and a time direction.

19. The OFDM transmit signal receiver according to claim 14, wherein:

said first S/N ratio generation circuit comprises a detection circuit configured to obtain a squared value (I variance value) of a difference between said detection output I signal and a reference I signal and a squared value (Q variance value) of a difference between said detection output Q signal and a reference Q signal, and an averaging circuit configured to obtain an average by averaging said I and Q variance values in both a frequency direction and a time direction; and said second S/N ratio generation circuit comprises a detection circuit configured to obtain a squared value (I variance value) of a difference between said equalization output I signal and a reference I signal and a squared value (Q variance value) of a difference between said equalization output Q signal and a reference Q signal, and an averaging circuit configured to obtain an average by averaging said I and Q variance values in both a frequency direction and a time direction.

20. The OFDM transmit signal receiver according to claim 13, wherein said selection circuit decides whether said S/N ratio output from said second S/N ratio generation circuit is valid or invalid and, if said S/N ratio is decided to be valid, selects said S/N ratio output from said second S/N ratio generation circuit and, if said S/N ratio is decided to be invalid, selects said S/N ratio output from said first S/N ratio generation circuit.

* * * * *